(12) United States Patent
Zhang et al.

(10) Patent No.: US 10,377,662 B2
(45) Date of Patent: Aug. 13, 2019

(54) HIGH PERFORMANCE GLASS FIBRE COMPOSITION, AND GLASS FIBRE AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 15/739,081

(22) PCT Filed: Mar. 21, 2016

(86) PCT No.: PCT/CN2016/076884
§ 371 (c)(1),
(2) Date: Dec. 21, 2017

(87) PCT Pub. No.: WO2016/165530
PCT Pub. Date: Oct. 20, 2016

(65) Prior Publication Data
US 2018/0179104 A1 Jun. 28, 2018

(30) Foreign Application Priority Data
Mar. 15, 2016 (CN) .............................. 201610147905

(51) Int. Cl.
C03C 13/00 (2006.01)
C03C 3/095 (2006.01)

(52) U.S. Cl.
CPC .............. *C03C 13/00* (2013.01); *C03C 3/095* (2013.01); *C03C 2213/00* (2013.01)

(58) Field of Classification Search
CPC ......... C03C 13/00; C03C 13/06; C03C 3/087; C03C 3/095
See application file for complete search history.

(56) References Cited

U.S. PATENT DOCUMENTS

| | | |
|---|---|---|
| 6,214,429 B1 | 4/2001 | Zou et al. |
| 6,627,569 B1 | 9/2003 | Naumann et al. |
| 9,051,206 B2 | 6/2015 | Allan et al. |
| 9,105,908 B2 | 8/2015 | Peuchert et al. |
| 9,556,059 B2 | 1/2017 | Li et al. |
| 2007/0179038 A1 | 8/2007 | Uehara |
| 2011/0028606 A1 | 2/2011 | Li et al. |
| 2013/0143459 A1 | 6/2013 | Li et al. |
| 2013/0217807 A1 | 8/2013 | McGinnis et al. |
| 2014/0141285 A1 | 5/2014 | Momono et al. |
| 2015/0017412 A1* | 1/2015 | Murata .................. C03B 18/02 428/220 |
| 2015/0018194 A1 | 1/2015 | Li et al. |
| 2016/0068428 A1 | 3/2016 | Li et al. |
| 2018/0179103 A1* | 6/2018 | Zhang ..................... C03C 13/00 |
| 2018/0186688 A1* | 7/2018 | Zhang ..................... C03C 13/00 |
| 2018/0208497 A1* | 7/2018 | Zhang ..................... C03C 3/087 |

FOREIGN PATENT DOCUMENTS

| | | | |
|---|---|---|---|
| CN | 1340034 A | 3/2002 | |
| CN | 103086605 A | 5/2013 | |
| CN | 103221354 A | 7/2013 | |
| CN | 103539347 A | 1/2014 | |
| CN | 104743888 A | 7/2015 | |
| CN | 105392744 A | 3/2016 | |
| FR | 2509716 A1 | 1/1983 | |
| JP | S5849638 A | 3/1983 | |
| JP | 2013500938 A | 1/2013 | |
| JP | 2013542909 A | 11/2013 | |
| JP | 2014094858 A * | 5/2014 | |
| JP | 2015098436 A | 5/2015 | |
| WO | 2012054432 A2 | 4/2012 | |
| WO | WO-2014062715 A1 * | 4/2014 | ............. C03C 3/095 |
| WO | 2015009686 A1 | 1/2015 | |

OTHER PUBLICATIONS

International Search Report for PCT/CN2016/076884 dated Dec. 16, 2016, and its English translation provided by WIPO.
Written Opinion of the International Search Authority PCT/CN2016/076884 dated Dec. 14, 2016, and its English translation by Google translator.
First Search for corresponding Chinese Application No. 201610147905.0 dated Sep. 15, 2017.
Office Action for corresponding Chinese Application No. 201610147905.0 dated Sep. 26, 2017. Translation provided by Espacenet.
Notification to Grant Patent Right for corresponding Chinese Application No. 201610147905.0 dated May 23, 2018. Translation provided by Espacenet.

(Continued)

*Primary Examiner* — Elizabeth A. Bolden
(74) *Attorney, Agent, or Firm* — Ladas & Parry, LLP

(57) ABSTRACT

The present invention provides a glass fiber composition, a glass fiber and a composite material therefrom. The glass fiber composition comprises the following components expressed as percentage by weight: 53-64% $SiO_2$, greater than 19% and lower than 25% $Al_2O_3$, 0.05-7% $Y_2O_3$+$La_2O_3$+$Gd_2O_3$, not greater than 1% $Li_2O$+$Na_2O$+$K_2O$, 10-24% CaO+MgO+SrO, 1.5-12% CaO, lower than 2% $TiO_2$, lower than 1.5% $Fe_2O_3$. Said composition can not only significantly improve the elastic modulus and chemical stability of the glass, but also overcome the technical problems in the manufacture of traditional high-performance glasses including high risk of crystallization, fining difficulty of molten glass and production efficiency difficulty with refractory-lined furnaces, significantly reduce the liquidus and forming temperatures and greatly reduce the crystallization rate under the same conditions, thus making it particularly suitable for production of high-performance glass fiber with excellent chemical stability in refractory-lined furnaces.

16 Claims, No Drawings

(56) References Cited

OTHER PUBLICATIONS

Office action from RU Application No. 2018117560/03, dated Feb. 1, 2019, with machine English translation from Google Translate.
From PCT/CN2016/076884, Written Opinion of the International Searching Authority, dated Dec. 14, 2016 with English translation provided by WIPO.
From PCT/CN2016/076884, International Preliminary Report on Patentability, dated Sep. 18, 2018, with English translation provided by WIPO.
From CA 2989206, Office action dated May 28, 2018.
From JP 2017-564688, Office action dated Oct. 16, 2018, with machine English translation from the Japanese Patent Office.

* cited by examiner

HIGH PERFORMANCE GLASS FIBRE COMPOSITION, AND GLASS FIBRE AND COMPOSITE MATERIAL THEREOF

CROSS REFERENCE TO RELATED APPLICATIONS

This application is the U.S. national phase of PCT Application PCT/CN2016/076884 filed on Mar. 21, 2016 which claims the priority of Chinese Patent Application 201610147905.0, filed Mar. 15, 2016 and titled "High Performance Glass Fibre Composition, Glass Fibre and Composite Material Thereof", the disclosures of which are incorporated herein by reference in their entireties.

FIELD OF THE INVENTION

The present invention relates to a glass fibre composition, specifically to a glass fibre composition that can be used as a reinforcing base material for composites, and to a glass fibre and composite material therefrom.

BACKGROUND OF THE INVENTION

Glass fibre is an inorganic fibre material that can be used to reinforce resins to produce composite materials with good performance. As a reinforcing base material for advanced composite materials, high-performance glass fibres were originally used mainly in the aerospace industry or the national defense industry. With the progress of science and technology and the development of economy, high-performance glass fibres have been widely used in civil and industrial fields such as wind blades, pressure vessels, offshore oil pipes and auto industry.

The original high-performance glass compositions were based on an $MgO$—$Al_2O_3$—$SiO_2$ system and a typical solution was S-2 glass of American company OC. The modulus of S-2 glass is 89-90 GPa; however, the production of this glass is excessively difficult, as its forming temperature is up to about 1571° C. and its liquidus temperature up to 1470° C., and therefore it is difficult to realize large-scale industrial production. Thus, OC stopped production of S-2 glass fibre and transferred its patent to American company AGY.

Thereafter, OC developed HiPer-tex glass having a modulus of 87-89 GPa, which were a trade-off for production scale by sacrificing some of the glass properties. However, as the designed solution was just a simple improvement over that of S-2 glass, the forming and liquidus temperatures remained high, which caused difficulty in attenuating glass fibre and consequently in realizing large-scale industrial production. Therefore, OC also stopped production of HiPer-tex glass fibre and transferred its patent to the European company 3B.

French company Saint-Gobain developed R glass that is based on an $MgO$—$CaO$—$Al_2O_3$—$SiO_2$ system, and its modulus is 86-89 GPa; however, the total contents of $SiO_2$ and $Al_2O_3$ remain high in the traditional R glass, and there is no effective solution to improve the crystallization performance, as the ratio of Ca to Mg is inappropriately designed, thus causing difficulty in fibre formation as well as a great risk of crystallization, high surface tension and fining difficulty of molten glass. The forming temperature of the R glass reaches 1410° C. and its liquidus temperature up to 1350° C. All these have caused difficulty in effectively attenuating glass fibre and consequently in realizing large-scale industrial production.

In China, Nanjing Fibreglass Research & Design Institute developed an HS2 glass having a modulus of 84-87 GPa. It primarily contains $SiO_2$, $Al_2O_3$ and MgO while also including certain amounts of $Li_2O$, $B_2O_3$, $CeO_2$ and $Fe_2O_3$. Its forming temperature is only 1245° C. and its liquidus temperature is 1320° C. Both temperatures are much lower than those of S glass. However, since its forming temperature is lower than its liquidus temperature, which is unfavorable for the control of glass fibre attenuation, the forming temperature has to be increased and specially-shaped tips have to be used to prevent a glass crystallization phenomenon from occurring in the fibre attenuation process. This causes difficulty in temperature control and also makes it difficult to realize large-scale industrial production.

To sum up, we find that, at present stage, the actual production of various high-performance glass fibres generally faces the difficulty of large-scale production with refractory-lined furnaces, specifically manifested by comparably high liquidus temperature, high crystallization rate, high forming temperature, fining difficulty of molten glass and a narrow temperature range ($\Delta T$) for fibre formation and even a negative $\Delta T$ value. Therefore, most companies tend to reduce the production difficulty by compromising some of the glass properties, thus making it impossible to improve the properties of the above-mentioned glass fibres with the growth of production scale. The problem of an insufficient modulus has long remained unresolved in the production of S glass fibre.

SUMMARY OF THE INVENTION

The present invention aims to solve the issue described above. The purpose of the present invention is to provide a high-performance glass fibre composition which can not only significantly improve the elastic modulus and chemical stability of the glass, but also overcome the technical problems in the manufacture of traditional high-performance glasses including high risk of crystallization, fining difficulty of molten glass and low efficiency of production in refractory-lined furnaces, and significantly reduce the liquidus temperature, forming temperature and crystallization rate under the same conditions, thus making it particularly suitable for production of high-performance glass fibre with excellent chemical stability in refractory-lined furnaces.

According to one aspect of the present invention, a glass fibre composition is provided comprising the following components expressed as percentage by weight:

| | |
|---|---|
| $SiO_2$ | 53-64% |
| $Al_2O_3$ | >19% and <25% |
| $RE_2O_3 = Y_2O_3 + La_2O_3 + Gd_2O_3$ | 0.05-7% |
| $R_2O = Li_2O + Na_2O + K_2O$ | ≤1% |
| $CaO + MgO + SrO$ | 10-24% |
| $CaO$ | 1.5-12% |
| $TiO_2$ | <2% |
| $Fe_2O_3$ | <1.5% | wherein, the restricted weight percentage ratio $C1=RE_2O_3/R_2O$ is greater than 0.5;

wherein, the restricted content range of $Li_2O$ is 0.05-0.85% by weight;

wherein, the restricted content range of $R_2O=Li_2O+Na_2O+K_2O$ is lower than 0.97% by weight;

wherein, the restricted content range of $Li_2O$ is at least 0.05 and lower than 0.55% by weight;

wherein, the restricted content range of $Li_2O$ is 0.1-0.5% by weight;

wherein, the restricted weight percentage ratio C2=Al$_2$O$_3$/MgO is greater than 1.8;

wherein, the restricted weight percentage ratio C2=Al$_2$O$_3$/MgO is greater than 1.95;

wherein, the restricted content range of SiO$_2$+Al$_2$O$_3$ is lower than 80.4% by weight;

wherein, the restricted content range of RE$_2$O$_3$=Y$_2$O$_3$+La$_2$O$_3$+Gd$_2$O$_3$ is 0.5-6% by weight;

Wherein, the said composition comprises the following components expressed as percentage by weight:

| | |
|---|---|
| SiO$_2$ | 53-64% |
| Al$_2$O$_3$ | >19% and <25% |
| RE$_2$O$_3$ = Y$_2$O$_3$ + La$_2$O$_3$ + Gd$_2$O$_3$ | 0.05-7% |
| R$_2$O = Li$_2$O + Na$_2$O + K$_2$O | ≤1% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5.

Wherein, the said composition comprises the following components expressed as percentage by weight:

| | |
|---|---|
| SiO$_2$ | 53-64% |
| Al$_2$O$_3$ | >19% and <25% |
| SiO$_2$ + Al$_2$O$_3$ | <82% |
| RE$_2$O$_3$ = Y$_2$O$_3$ + La$_2$O$_3$ + Gd$_2$O$_3$ | 0.05-7% |
| R$_2$O = Li$_2$O + Na$_2$O + K$_2$O | ≤1% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5.

Wherein, the said composition comprises the following components expressed as percentage by weight:

| | |
|---|---|
| SiO$_2$ | 53-64% |
| Al$_2$O$_3$ | >19% and <25% |
| SiO$_2$ + Al$_2$O$_3$ | <80.4% |
| RE$_2$O$_3$ = Y$_2$O$_3$ + La$_2$O$_3$ + Gd$_2$O$_3$ | 0.05-7% |
| R$_2$O = Li$_2$O + Na$_2$O + K$_2$O | <0.97% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5.

wherein, the restricted content range of R$_2$O=Li$_2$O+Na$_2$O+K$_2$O is not greater than 0.95% in percentage by weight;

wherein, the restricted content range of R$_2$O=Li$_2$O+Na$_2$O+K$_2$O is not greater than 0.85% in percentage by weight;

Wherein, the said composition comprises the following components expressed as percentage by weight:

| | |
|---|---|
| SiO$_2$ | 53-64% |
| Al$_2$O$_3$ | >19% and <25% |
| RE$_2$O$_3$ = Y$_2$O$_3$ + La$_2$O$_3$ + Gd$_2$O$_3$ | 0.05-7% |
| R$_2$O = Li$_2$O + Na$_2$O + K$_2$O | ≤1% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5, and the weight percentage ratio C2=Al$_2$O$_3$/MgO is greater than 1.8.

Wherein, the said composition comprises the following components expressed as percentage by weight:

| | |
|---|---|
| SiO$_2$ | 53-64% |
| Al$_2$O$_3$ | >19% and <25% |
| SiO$_2$ + Al$_2$O$_3$ | <82% |
| RE$_2$O$_3$ = Y$_2$O$_3$ + La$_2$O$_3$ + Gd$_2$O$_3$ | 0.5-6% |
| R$_2$O = Li$_2$O + Na$_2$O + K$_2$O | ≤1% |
| Li$_2$O | ≥0.05% and <0.55% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5, and the weight percentage ratio C2=Al$_2$O$_3$/MgO is greater than 1.8.

Wherein, the said composition comprises the following components expressed as percentage by weight:

| | |
|---|---|
| SiO$_2$ | 53-64% |
| Al$_2$O$_3$ | >19% and <25% |
| SiO$_2$ + Al$_2$O$_3$ | <82% |
| RE$_2$O$_3$ = Y$_2$O$_3$ + La$_2$O$_3$ + Gd$_2$O$_3$ | 0.5-6% |
| R$_2$O = Li$_2$O + Na$_2$O + K$_2$O | <0.97% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 0.5, and the weight percentage ratio C2=Al$_2$O$_3$/MgO is greater than 1.95.

Wherein, the said composition comprises the following components expressed as percentage by weight:

| | |
|---|---|
| SiO$_2$ | 54-62% |
| Al$_2$O$_3$ | >19% and ≤23% |
| SiO$_2$ + Al$_2$O$_3$ | <80.4% |
| RE$_2$O$_3$ = Y$_2$O$_3$ + La$_2$O$_3$ + Gd$_2$O$_3$ | 0.5-6% |
| R$_2$O = Li$_2$O + Na$_2$O + K$_2$O | ≤1% |
| Li$_2$O | 0.05-0.85% |
| CaO + MgO + SrO | 10-24% |
| CaO | 1.5-12% |
| TiO$_2$ | <2% |
| Fe$_2$O$_3$ | <1.5% |

In addition, the weight percentage ratio C1=RE$_2$O$_3$/R$_2$O is greater than 1, and the weight percentage ratio C2=Al$_2$O$_3$/MgO is greater than 1.95.

wherein, the restricted content range of Na$_2$O+K$_2$O is lower than 0.7% by weight;

wherein, the restricted content range of TiO$_2$ is not greater than 0.75% by weight;

wherein, the restricted content range of Al$_2$O$_3$ is greater than 19% and not greater than 19.4% by weight;

wherein, the restricted content range of $Al_2O_3$ is greater than 19.4% and not greater than 23% by weight;

wherein, the restricted content range of SrO is 0.1-2% by weight;

wherein, the restricted content range of $Gd_2O_3$ is 0.05-1% by weight;

Wherein, the said composition comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $La_2O_3 + Gd_2O_3$ | 0.1-3% |
| $R_2O = Li_2O + Na_2O + K_2O$ | ≤1% |
| $Li_2O$ | 0.05-0.85% |
| $CaO + MgO + SrO$ | 10-24% |
| $CaO$ | 1.5-12% |
| $TiO_2$ | ≤0.75% |
| $Fe_2O_3$ | <1.5% |

In addition, the weight percentage ratio $C1=RE_2O_3/R_2O$ is greater than 0.5.

Wherein, the said composition comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $Y_2O_3$ | 0.5-5% |
| $R_2O = Li_2O + Na_2O + K_2O$ | <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the weight percentage ratio $C1=RE_2O_3/R_2O$ is greater than 0.5, and the weight percentage ratio $C2=Al_2O_3/MgO$ is greater than 1.8.

wherein, the restricted weight percentage ratio $C1=RE_2O_3/R_2O$ is 1.5-5.

wherein, the restricted weight percentage ratio $C2=Al_2O_3/MgO$ is 2-2.45.

wherein, the restricted content range of CaO is 5-10% by weight;

wherein, the restricted content range of MgO is 8.1-12% by weight;

wherein, the restricted content range of $La_2O_3$ is 0.1-2% by weight;

Wherein, said high-performance composition comprises $F_2$ with a content range of 0-1.2% in percentage by weight;

Wherein, said high-performance composition comprises $B_2O_3$ with a content range of 0-2% in percentage by weight;

Wherein, said high-performance composition comprises $CeO_2$ with a content range of 0-1% in percentage by weight.

According to another aspect of this invention, a glass fibre produced with said glass fibre composition is provided.

According to yet another aspect of this invention, a composite material incorporating said glass fibre is provided.

The main inventive points of the glass fibre composition according to this invention include: introducing one or more rare earth oxides from the group consisting of $Y_2O_3$, $La_2O_3$ and $Gd_2O_3$ while including a high content of alumina and a low content of alkali metal oxides, utilizing the synergistic effect among rare earth oxides, alkali metal oxides and alumina, controlling the ratios of $RE_2O_3/R_2O$ and $Al_2O_3/MgO$, reasonably configuring the content ranges of $Al_2O_3$, $R_2O$, $Li_2O$, $Y_2O_3$, $La_2O_3$, $Gd_2O_3$, CaO and CaO+MgO+SrO respectively and utilizing the CaO, MgO and SrO mixed alkali earth effect, and a selective introduction of $F_2$, $B_2O_3$ and $CeO_2$ at appropriate amounts.

Specifically, the high-performance glass fibre composition according to the present invention comprises the following components expressed as percentage by weight:

| | |
|---|---|
| $SiO_2$ | 53-64% |
| $Al_2O_3$ | >19% and <25% |
| $RE_2O_3 = Y_2O_3 + La_2O_3 + Gd_2O_3$ | 0.05-7% |
| $R_2O = Li_2O + Na_2O + K_2O$ | ≤1% |
| $CaO + MgO + SrO$ | 10-24% |
| $CaO$ | 1.5-12% |
| $TiO_2$ | <2% |
| $Fe_2O_3$ | <1.5% |

The effect and content of each component in said glass fibre composition is described as follows:

$SiO_2$ is a main oxide forming the glass network and has the effect of stabilizing all the components. In the glass fibre composition of the present, invention, the restricted content range of $SiO_2$ is 53-64%, preferably 54-62%.

$Al_2O_3$ is another main oxide forming the glass network. When combined with $SiO_2$, it can have a substantive effect on the mechanical properties of the glass and have a significant effect on water and acid resistance. In order to obtain sufficiently high mechanical properties and water and acid resistance of the glass, the content of $Al_2O_3$ should be desirably high. However, too high of a content will cause the glass viscosity to be excessively high thereby resulting in melting and fining issues, together with a risk of glass crystallization and phase separation. In one embodiment, the inventors have unexpectedly found that when the content range of $Al_2O_3$ is kept to be greater than 19% and lower than 25%, the content range of $Li_2O+Na_2O+K_2O$ to be not greater than 1%, and an appropriate amount of rare earth oxides is introduced, the glass can have excellent elastic modulus, chemical stability and crystallization resistance as well as a broad temperature range ($\Delta T$) for fibre formation. Therefore, in the glass fibre composition of the present invention, the restricted content range of $Al_2O_3$ is greater than 19% and lower than 25%, preferably greater than 19% and not greater than 23%. Furthermore, in one embodiment, the restricted content range of $Al_2O_3$ can be greater than 19% and not greater than 19.4%; in another embodiment, the restricted content range of $Al_2O_3$ can be greater than 19.4% and not greater than 23%. In addition, the restricted content range of $SiO_2+Al_2O_3$ can be lower than 82%, preferably lower than 80.4%.

In the glass structure, $Al_2O_3$ is generally present in two coordination states, i.e., four-coordinated state ($AlO_4$) and six-coordinated state ($AlO_6$). The inventors find that, by introducing not only a high content of $Al_2O_3$ and a low content of alkali metal oxides, but also one or more rare earth oxides from the group consisting of $Y_2O_3$, $La_2O_3$ and $Gd_2O_3$ so as to utilize the high alkali properties of rare earth oxides to produce a significant non-bridging oxygen effect, the amount of $Al_2O_3$ in tetrahedral coordination would become noticeably high, thus promoting more $Al^{3+}$ ions to enter the glass network and accordingly help to enhance the compactness of the network. Moreover, it is difficult for each of the fore-mentioned three rare earth ions to enter the glass network, and they usually exist as external ions at the gaps of the glass network. These ions have large coordination numbers, high electric charge and field strength, and high accumulation capability, and therefore can help to improve the structural stability of the glass and increase the mechanical properties and chemical stability of the glass. Meanwhile, they can also effectively prevent the movement and arrangement of other ions so as to minimize the glass crystallization tendency and improve its chemical stability.

The inventors also find that, when used separately, $Y_2O_3$ has better effects than $La_2O_3$ or $Gd_2O_3$ in improving the glass modulus and prohibiting crystallization. Moreover, when two or more rare earth oxides are used simultaneously and the ratios therebetween are appropriately controlled, an unexpectedly remarkable synergistic effect will be achieved, i.e. the effect in improving the glass modulus and prohibiting crystallization is better than that when only one rare earth oxide is used at a time. The inventors believe that this is because, one the one hand, two or more rare earth oxides used simultaneously can provide more external ions of the network for the coordination, thus helping to improve the structural stability of the glass and increase the glass modulus and, on the other hand, the rare earth ions of various radiuses are less likely to give rise to regular arrangements, which is conducive to significantly reducing the growth rate of crystals and thus improving the crystallization resistance of the glass.

In the glass fibre composition of the present invention, the restricted range of the weight percentage $RE_2O_3=Y_2O_3+La_2O_3+Gd_2O_3$ can be 0.05-7%, preferably 0.5-6%. Furthermore, the restricted range of the weight percentage $La_2O_3+Gd_2O_3$ can be 0.1-3%. Furthermore, the restricted range of the weight percentage $Y_2O_3$ can be 0.5-5%. Furthermore, the restricted range of the weight percentage $La_2O_3$ can be 0.1-2%. Furthermore, the restricted range of the weight percentage $Gd_2O_3$ can be 0.05-1%.

Both $K_2O$ and $Na_2O$ can reduce glass viscosity and are good fluxing agents. Compared with $Na_2O$ and $K_2O$, $Li_2O$ can not only significantly reduce glass viscosity thereby improving the glass melting performance, but also help greatly improve the mechanical properties of glass. In addition, a small amount of $Li_2O$ provides considerable non-bridging oxygen, which helps more aluminum ions to form tetrahedral coordination and enhances the network structure of the glass. However, as too many alkali metal ions in the glass composition would significantly reduce the chemical stability of the glass, the introduced amount should be limited. Therefore, in the glass fibre composition of the present invention, the restricted content range of $Li_2O+Na_2O+K_2O$ can be not greater than 1%, preferably lower than 0.97%, more preferably not greater than 0.95%, and still more preferably not greater than 0.85%. Furthermore, the restricted content range of $Li_2O$ can be 0.05-0.85%, preferably at least 0.05% but lower than 0.55%, and more preferably 0.1-0.5%. Furthermore, the restricted content range of $Na_2O+K_2O$ can be lower than 0.7%.

Furthermore, for the purpose that the non-bridging oxygen produced by alkali metal oxides can be effectively accumulated by rare earth ions and thus more aluminum ions can enter the glass network in the form of $AlO_4$, in the glass fibre composition of the present invention, the restricted range of the weight percentage ratio $C1=RE_2O_3/R_2O$ can be greater than 0.5, preferably greater than 1, and more preferably can be 1.5-5.

CaO, MgO and SrO mainly control the glass crystallization and regulate the glass viscosity. Particularly on the control of the glass crystallization, the inventors have obtained unexpected effects by controlling the introduced amounts of them and the ratios between them. Generally, for a high-performance glass based on the MgO—CaO—$Al_2O_3$—$SiO_2$ system, the crystal phases it contains after glass crystallization include mainly diopside ($CaMgSi_2O_6$) and anorthite ($CaAl_2Si_2O_8$). In order to inhibit the tendency of these two crystal phases to crystallize and reduce the liquidus temperature and crystallization rate of the glass, this invention has rationally controlled the content range of CaO+MgO+SrO and the ratios therebetween to utilize the mixed alkali earth effect for a more compact stacking structure, so that more energy will be needed for the crystal nucleus to form and grow and therefore the tendency of glass crystallization will be inhibited. Moreover, the strontium oxide introduced with an appropriate amount can help to make a more stable glass structure, thus further improving the properties of the glass. In the glass fibre composition of this invention, the restricted content range of CaO+MgO+SrO can be 10-24%. As a network modifier, too much CaO would increase the crystallization tendency of the glass that lead to the precipitation of crystals such as anorthite and wollastonite from the glass melt. Therefore, the content range of CaO can be 1.5-12%, preferably 5-10%. MgO has the similar effect in the glass network as CaO, except that the field strength of $Mg^{2+}$ is higher, which plays an important role in increasing the glass modulus. Furthermore, the content range of MgO can be 8.1-12%. Furthermore, the content range of SrO can be lower than 3%, and preferably can be 0.1-2%.

Furthermore, in the glass fibre composition of the present invention, in order to effectively control the crystallization of the glass, the restricted range of the weight percentage ratio $C2=Al_2O_3/MgO$ can be greater than 1.8, preferably greater than 1.95, and more preferably can be 2-2.45.

$TiO_2$ not only has a fluxing effect, but also can significantly improve the chemical stability of glass. It also has a certain effect of reducing the surface tension of the molten glass. However, since an excessive amount of $Ti^{4+}$ ions could have an undesired coloring effect, the introduced amount should be limited. In the glass fibre composition of the present invention, the restricted content range of $TiO_2$ is lower than 2%, preferably not greater than 0.75%.

$Fe_2O_3$ facilitates the melting of glass and can also improve the crystallization performance of glass. However, since ferric ions and ferrous ions have a coloring effect, the introduced amount should be limited. Therefore, in the glass fibre composition of the present invention, the restricted content range of $Fe_2O_3$ is lower than 1.5%.

In the glass fibre composition of the present invention, an appropriate amount of $F_2$, $B_2O_3$ or $CeO_2$ can be introduced to further improve the crystallization and fining performance of glass. In the glass fibre composition of the present invention, the restricted content range of $F_2$ can be 0-1.2%; the restricted content range of $B_2O_3$ can be 0-2%; and the restricted content range of $CeO_2$ can be 0-1%.

In addition, the glass fibre composition of the present invention can include small amounts of other components with a total content not greater than 2%.

In the glass fibre composition of the present invention, the beneficial effects produced by the aforementioned selected ranges of the components will be explained by way of examples through the specific experimental data.

The following are embodiments of preferred content ranges of the components contained in the glass fibre composition according to the present invention. The elastic modulus of the glass fibre made from the compositions according to these embodiments is more than 90 GPa.

PREFERRED EMBODIMENT 1

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $R_2O = Li_2O + Na_2O + K_2O$ | ≤1% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5.

PREFERRED EMBODIMENT 2

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <80.4% |
| $RE_2O_3 = Y_2O_3 + La_2O_3 + Gd_2O_3$ | 0.05-7% |
| $R_2O = Li_2O + Na_2O + K_2O$ | <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5.

PREFERRED EMBODIMENT 3

The high-performance glass fibre composition according to the present invention comprises the following components expressed as percentage by weight:

| | |
|---|---|
| $SiO_2$ | 53-64% |
| $Al_2O_3$ | >19% and <25% |
| $RE_2O_3 = Y_2O_3 + La_2O_3 + Gd_2O_3$ | 0.05-7% |
| $R_2O = Li_2O + Na_2O + K_2O$ | ≤1% |
| $Li_2O$ | 0.1-0.5% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5, and the range of the weight percentage ratio $C2=Al_2O_3/MgO$ is greater than 1.8.

PREFERRED EMBODIMENT 4

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.5-6% |
| $R_2O = Li_2O + Na_2O + K_2O$ | ≤1% |
| $Li_2O$ | ≥0.05% and <0.55% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5, and the range of the weight percentage ratio $C2=Al_2O_3/MgO$ is greater than 1.8.

PREFERRED EMBODIMENT 5

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.5-6% |
| $R_2O = Li_2O + Na_2O + K_2O$ | <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |
| $Gd_2O_3$ | 0.05-1% |

In addition, the range of the weight percentage ratio $C1=RE_2O_3/R_2O$ is greater than 0.5, and the range of the weight percentage ratio $C2=Al_2O_3/MgO$ is greater than 1.95.

PREFERRED EMBODIMENT 6

The high-performance glass fibre composition according to the present invention comprises the following components expressed as percentage by weight:

| | |
|---|---|
| $SiO_2$ | 54-62% |
| $Al_2O_3$ | >19% and ≤23% |
| $SiO_2 + Al_2O_3$ | <80.4% |
| $RE_2O_3 = Y_2O_3 + La_2O_3 + Gd_2O_3$ | 0.5-6% |
| $R_2O = Li_2O + Na_2O + K_2O$ | ≤0.95% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 1, and the range of the weight percentage ratio $C2=Al_2O_3/MgO$ is greater than 1.95.

PREFERRED EMBODIMENT 7

The high-performance glass fibre composition according to the present invention comprises the following components expressed as percentage by weight:

| | |
|---|---|
| $SiO_2$ | 53-64% |
| $Al_2O_3$ | >19% and <25% |

| | |
|---|---|
| $SiO_2 + Al_2O_3$ | <82% |
| $RE_2O_3 = Y_2O_3 + La_2O_3 + Gd_2O_3$ | 0.05-7% |
| $La_2O_3 + Gd_2O_3$ | 0.1-3% |
| $R_2O = Li_2O + Na_2O + K_2O$ | ≤0.85% |
| $Li_2O$ | 0.05-0.85% |
| $CaO + MgO + SrO$ | 10-24% |
| $CaO$ | 1.5-12% |
| $TiO_2$ | ≤0.75% |
| $Fe_2O_3$ | <1.5% |

In addition, the range of the weight percentage ratio $C1=RE_2O_3/R_2O$ is greater than 0.5.

PREFERRED EMBODIMENT 8

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $Y_2O_3$ | 0.5-5% |
| $R_2O = Li_2O + Na_2O + K_2O$ | <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5, and the range of the weight percentage ratio $C2=Al_2O_3/MgO$ is greater than 1.8.

PREFERRED EMBODIMENT 9

The high-performance glass fibre composition according to the present invention comprises the following components expressed as percentage by weight:

| | |
|---|---|
| $SiO_2$ | 53-64% |
| $Al_2O_3$ | >19% and ≤19.4% |
| $SiO_2 + Al_2O_3$ | <82% |
| $RE_2O_3 = Y_2O_3 + La_2O_3 + Gd_2O_3$ | 0.5-6% |
| $R_2O = Li_2O + Na_2O + K_2O$ | <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 0.5, and the range of the weight percentage ratio $C2=Al_2O_3/MgO$ is greater than 1.95.

PREFERRED EMBODIMENT 10

The high-performance glass fibre composition according to the present invention comprises the following components expressed as percentage by weight:

| | |
|---|---|
| $SiO_2$ | 54-62% |
| $Al_2O_3$ | >19.4% and ≤23% |
| $SiO_2 + Al_2O_3$ | <80.4% |
| $RE_2O_3 = Y_2O_3 + La_2O_3 + Gd_2O_3$ | 0.5-6% |
| $R_2O = Li_2O + Na_2O + K_2O$ | ≤1% |
| $Li_2O$ | 0.05-0.85% |
| $Na_2O + K_2O$ | <0.7% |
| $CaO + MgO + SrO$ | 10-24% |
| $CaO$ | 1.5-12% |
| $TiO_2$ | <2% |
| $Fe_2O_3$ | <1.5% |

In addition, the range of the weight percentage ratio $C1=RE_2O_3/R_2O$ is greater than 1, and the range of the weight percentage ratio $C2=Al_2O_3/MgO$ is greater than 1.95.

PREFERRED EMBODIMENT 11

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $La_2O_3 + Gd_2O_3$ | 0.1-3% |
| $R_2O = Li_2O + Na_2O + K_2O$ | ≤1% |
| $Li_2O$ | 0.05-0.85% |
| $CaO + MgO + SrO$ | 10-24% |
| $CaO$ | 1.5-12% |
| $TiO_2$ | ≤0.75% |
| $Fe_2O_3$ | <1.5% |
| $SrO$ | 0.1-2% |
| $F_2$ | 0-1.2% |

In addition, the range of the weight percentage ratio $C1=RE_2O_3/R_2O$ is 1.5-5.

PREFERRED EMBODIMENT 12

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $La_2O_3 + Gd_2O_3$ | 0.1-3% |
| $R_2O = Li_2O + Na_2O + K_2O$ | ≤1% |
| $Li_2O$ | 0.05-0.85% |
| $CaO + MgO + SrO$ | 10-24% |
| $CaO$ | 1.5-12% |
| $TiO_2$ | ≤0.75% |
| $Fe_2O_3$ | <1.5% |
| $B_2O_3$ | 0-2% |
| $CeO_2$ | 0-1% |

In addition, the range of the weight percentage ratio $C1=RE_2O_3/R_2O$ is greater than 0.5, and the range of the weight percentage ratio $C2=Al_2O_3/MgO$ is 2-2.45.

PREFERRED EMBODIMENT 13

The high-performance glass fibre composition according to the present invention comprises the following components expressed as percentage by weight:

| | |
|---|---|
| $SiO_2$ | 53-64% |
| $Al_2O_3$ | >19% and <25% |
| $SiO_2 + Al_2O_3$ | <80.4% |
| $RE_2O_3 = Y_2O_3 + La_2O_3 + Gd_2O_3$ | 0.05-7% |
| $R_2O = Li_2O + Na_2O + K_2O$ | <0.97% |
| $Li_2O$ | 0.05-0.85% |
| $CaO + MgO + SrO$ | 10-24% |
| $CaO$ | 5-10% |
| $MgO$ | 8.1-12% |
| $TiO_2$ | <2% |
| $Fe_2O_3$ | <1.5% |
| $La_2O_3$ | 0.1-2% |

In addition, the range of the weight percentage ratio $C1=RE_2O_3/R_2O$ is greater than 0.5.

According to the preferred embodiment 13, the elastic modulus of the glass fibre formed from the composition is greater than 95 GPa.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the glass fibre composition expressed as percentage by weight are: 53-64% $SiO_2$, greater than 19% and lower than 25% $Al_2O_3$, 0.05-7% $Y_2O_3+La_2O_3+Gd_2O_3$, not greater than 1% $Li_2O+Na_2O+K_2O$, 10-24% $CaO+MgO+SrO$, 1.5-12% $CaO$, lower than 2% $TiO_2$ and lower than 1.5% $Fe_2O_3$. Said composition can not only significantly improve the elastic modulus and chemical stability of the glass, but also overcome the technical problems in the manufacture of traditional high-performance glasses including high risk of crystallization, fining difficulty of molten glass and production efficiency difficulty with refractory-lined furnaces, significantly reduce the liquidus and forming temperatures, and greatly reduce the crystallization rate under the same conditions, thus making it particularly suitable for production of high-performance glass fibre with excellent chemical stability in refractory-lined furnaces.

The specific content values of $SiO_2$, $Al_2O_3$, $CaO$, $MgO$, $Li_2O$, $Na_2O$, $K_2O$, $Fe_2O_3$, $TiO_2$, $SrO$, $Y_2O_3$, $La_2O_3$, $Gd_2O_3$, $F_2$ and $CeO_2$ in the glass fibre composition of the present invention are selected to be used in the examples, and comparisons with S glass, traditional R glass and improved R glass are made in terms of the following six property parameters, (1) Forming temperature, the temperature at which the glass melt has a viscosity of $10^3$ poise.

(2) Liquidus temperature, the temperature at which crystal nucleuses begin to form when the glass melt cools off—i.e., the upper limit temperature for glass crystallization.

(3) ΔT value, which is the difference between the forming temperature and the liquidus temperature and indicates the temperature range at which fibre drawing can be performed.

(4) Peak crystallization temperature, the temperature which corresponds to the strongest peak of glass crystallization in a DTA testing. Generally, the higher this temperature is, the more energy is needed for crystal nucleuses to grow and the lower the glass crystallization tendency is.

(5) Elastic modulus, the longitudinal elastic modulus defining the ability of glass to resist elastic deformation, which is to be measured as per ASTM2343.

(6) Powder weight loss, to be determined in a procedure set out as follows: Crush and grind the prepared glass appropriately and then sieve the powder to collect those sized 0.4-0.6 mm (that can pass 60-mesh but cannot pass 80-mesh sieves). Weigh to prepare three samples from the collected powder, 3 g for each sample, and place each sample respectively into a 10% HCL solution with a preset amount to be water bathed at 95° C. for 24 hours. Calculate the average weight loss of the sample powder to characterize the chemical stability of the glass.

The aforementioned six parameters and the methods of measuring them are well-known to one skilled in the art. Therefore, these parameters can be effectively used to explain the properties of the glass fibre composition of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fibre. The glass fibre is attenuated onto the rotary collet of a winder to form cakes or packages. Of course, conventional methods can be used to deep process these glass fibres to meet the expected requirements.

The exemplary embodiments of the glass fibre composition according to the present invention are given below.

Example 1

| | |
|---|---|
| $SiO_2$ | 58.0% |
| $Al_2O_3$ | 19.1% |
| $CaO$ | 7.9% |
| $MgO$ | 9.4% |
| $Y_2O_3$ | 3.6% |
| $Na_2O$ | 0.18% |
| $K_2O$ | 0.31% |
| $Li_2O$ | 0.45% |
| $Fe_2O_3$ | 0.44% |
| $TiO_2$ | 0.43% |

In addition, the weight percentage ratio $C1=RE_2O_3/R_2O$ is 3.83, and the weight percentage ratio $C2=Al_2O_3/MgO$ is 2.03.

In Example 1, the measured values of the six parameters are respectively:

| | |
|---|---|
| Forming temperature | 1300° C. |
| Liquidus tempetature | 1204° C. |
| ΔT | 96° C. |
| Peak crystallization tempetature | 1030° C. |
| Elastic modulus | 95.7 GPa |
| Powder weight loss | 0.98% |

Example 2

| | |
|---|---|
| $SiO_2$ | 58.0% |
| $Al_2O_3$ | 19.1% |
| CaO | 7.2% |
| MgO | 9.4% |
| $Y_2O_3$ | 3.6% |
| $Na_2O$ | 0.18% |
| $K_2O$ | 0.31% |
| $Li_2O$ | 0.45% |
| $Fe_2O_3$ | 0.44% |
| $TiO_2$ | 0.43% |
| SrO | 0.7% |

In addition, the weight percentage ratio $C1=RE_2O_3/R_2O$ is 3.83, and the weight percentage ratio $C2=Al_2O_3/MgO$ is 2.03.

In Example 2, the measured values of the six parameters are respectively:

| | |
|---|---|
| Forming temperature | 1302° C. |
| Liquidus temperature | 1201° C. |
| ΔT | 101° C. |
| Peak crystallization temperature | 1032° C. |
| Elastic modulus | 96.5 GPa |
| Powder weight loss | 0.95% |

Example 3

| | |
|---|---|
| $SiO_2$ | 56.9% |
| $Al_2O_3$ | 21.0% |
| CaO | 5.3% |
| MgO | 10.4% |
| $Y_2O_3$ | 3.5% |
| $La_2O_3$ | 0.5% |
| $Na_2O$ | 0.11% |
| $K_2O$ | 0.24% |
| $Li_2O$ | 0.61% |
| $Fe_2O_3$ | 0.44% |
| $TiO_2$ | 0.74% |

In addition, the weight percentage ratio $C1=RE_2O_3/R_2O$ is 4.17, and the weight percentage ratio $C2=Al_2O_3/MgO$ is 2.02.

In Example 3, the measured values of the six parameters are respectively:

| | |
|---|---|
| Forming temperature | 1306° C. |
| Liquidus temperature | 1216° C. |
| ΔT | 90° C. |
| Peak crystallization temperature | 1023° C. |
| Elastic modulus | 97.6 GPa |
| Powder weight loss | 0.95% |

Example 4

| | |
|---|---|
| $SiO_2$ | 56.1% |
| $Al_2O_3$ | 21.6% |
| CaO | 6.2% |
| MgO | 9.0% |
| $Y_2O_3$ | 3.8% |
| $La_2O_3$ | 0.4% |
| $Na_2O$ | 0.12% |
| $K_2O$ | 0.28% |
| $Li_2O$ | 0.54% |
| $Fe_2O_3$ | 0.44% |
| $TiO_2$ | 0.62% |
| SrO | 0.5% |

In addition, the weight percentage ratio $C1=RE_2O_3/R_2O$ is 4.47, and the weight percentage ratio $C2=Al_2O_3/MgO$ i's 2.40.

In Example 4, the measured values of the six parameters are respectively:

| | |
|---|---|
| Forming temperature | 1305° C. |
| Liquidus temperature | 1220° C. |
| ΔT | 85° C. |
| Peak crystallization temperature | 1022° C. |
| Elastic modulus | 99.2 GPa |
| Powder weight loss | 0.8% |

Example 5

| | |
|---|---|
| $SiO_2$ | 58.1% |
| $Al_2O_3$ | 19.2% |
| CaO | 7.3% |
| MgO | 9.3% |
| $Y_2O_3$ | 2.0% |
| $La_2O_3$ | 1.6% |
| $Na_2O$ | 0.18% |
| $K_2O$ | 0.21% |
| $Li_2O$ | 0.51% |
| $Fe_2O_3$ | 0.44% |
| $TiO_2$ | 0.95% |

In addition, the weight percentage ratio $C1=RE_2O_3/R_2O$ is 4.0, and the weight percentage ratio $C2=Al_2O_3/MgO$ is 2.06.

In Example 5, the measured values of the six parameters are respectively:

| | |
|---|---|
| Forming temperature | 1296° C. |
| Liquidus temperature | 1199° C. |
| ΔT | 97° C. |
| Peak crystallization temperature | 1033° C. |
| Elastic modulus | 94.7 GPa |
| Powder weight loss | 0.85% |

Example 6

| | |
|---|---|
| $SiO_2$ | 58.3% |
| $Al_2O_3$ | 19.3% |
| CaO | 7.3% |
| MgO | 8.9% |
| $Y_2O_3$ | 3.7% |
| $La_2O_3$ | 0.4% |
| $Na_2O$ | 0.23% |
| $K_2O$ | 0.18% |
| $Li_2O$ | 0.54% |
| $Fe_2O_3$ | 0.44% |
| $TiO_2$ | 0.51% |

In addition, the weight percentage ratio $C1=RE_2O_3/R_2O$ is 4.32, and the weight percentage ratio $C2=Al_2O_3/MgO$ is 2.17.

In Example 6, the measured values of the six parameters are respectively:

| | |
|---|---|
| Forming temperature | 1303° C. |
| Liquidus temperature | 1204° C. |
| ΔT | 99° C. |
| Peak crystallization temperature | 1030° C. |
| Elastic modulus | 97.4 GPa |
| Powder weight loss | 0.9% |

Comparisons of the property parameters of the aforementioned examples and other examples of the glass fibre composition of the present invention with those of S glass, traditional R glass and improved R glass are further made below by way of tables, wherein the component contents of the glass fibre composition are expressed as weight percentage. What needs to be made clear is that the total amount of the components in the examples is slightly less than 100%, and it should be understood that the remaining amount is trace impurities or a small amount of components which cannot be analyzed.

TABLE 1A

| | | A1 | A2 | A3 | A4 | A5 | A6 | A7 |
|---|---|---|---|---|---|---|---|---|
| Component | $SiO_2$ | 58.0 | 58.0 | 58.0 | 58.0 | 58.3 | 58.0 | 57.8 |
| | $Al_2O_3$ | 19.1 | 19.1 | 19.1 | 19.1 | 19.1 | 19.4 | 20.0 |
| | CaO | 7.9 | 7.2 | 7.2 | 7.6 | 8.3 | 8.0 | 8.1 |
| | MgO | 9.4 | 9.4 | 9.4 | 9.2 | 10.2 | 9.0 | 9.2 |
| | $Y_2O_3$ | 3.6 | 3.6 | 3.3 | 4.1 | 1.8 | 3.6 | — |
| | $La_2O_3$ | — | — | 0.5 | — | — | — | 1.7 |
| | $Gd_2O_3$ | — | — | — | — | — | — | 0.3 |
| | $Na_2O$ | 0.18 | 0.18 | 0.18 | 0.18 | 0.22 | 0.18 | 0.13 |
| | $K_2O$ | 0.31 | 0.31 | 0.31 | 0.31 | 0.20 | 0.31 | 0.22 |
| | $Li_2O$ | 0.45 | 0.45 | 0.45 | 0.45 | 0.54 | 0.45 | 0.61 |
| | $Fe_2O_3$ | 0.44 | 0.44 | 0.44 | 0.44 | 0.44 | 0.44 | 0.44 |
| | $TiO_2$ | 0.43 | 0.43 | 0.43 | 0.43 | 0.71 | 0.43 | 1.2 |
| | SrO | — | 0.7 | 0.5 | — | — | — | — |
| Ratio | C1 | 3.83 | 3.83 | 4.04 | 4.36 | 1.88 | 3.83 | 2.08 |
| | C2 | 2.03 | 2.03 | 2.03 | 2.08 | 1.87 | 2.16 | 2.17 |
| Parameter | Forming temperature/° C. | 1300 | 1302 | 1298 | 1298 | 1295 | 1304 | 1308 |
| | Liquidus temperature/° C. | 1204 | 1201 | 1199 | 1197 | 1212 | 1202 | 1210 |
| | ΔT/° C. | 96 | 101 | 99 | 101 | 83 | 103 | 98 |
| | Peak crystallization temperature/° C. | 1030 | 1032 | 1034 | 1034 | 1024 | 1032 | 1028 |
| | Elastic modulus/GPa | 95.7 | 96.5 | 97.0 | 97.9 | 93.1 | 95.8 | 92.8 |
| | Powder weight loss/% | 0.98 | 0.95 | 0.93 | 0.9 | 1.05 | 0.95 | 0.98 |

TABLE 1B

| | | A8 | A9 | A10 | A11 | A12 | A13 | A14 |
|---|---|---|---|---|---|---|---|---|
| Component | $SiO_2$ | 58.1 | 58.1 | 56.1 | 58.3 | 58.3 | 58.5 | 57.4 |
| | $Al_2O_3$ | 19.2 | 19.2 | 21.6 | 19.1 | 19.3 | 19.3 | 20.3 |
| | CaO | 6.7 | 7.3 | 6.2 | 6.8 | 7.3 | 7.0 | 7.0 |
| | MgO | 9.3 | 9.3 | 9.0 | 9.2 | 8.9 | 8.9 | 9.2 |
| | $Y_2O_3$ | 1.6 | 2.0 | 3.8 | 4.0 | 3.7 | 3.7 | 2.4 |
| | $La_2O_3$ | 2.0 | 1.6 | 0.4 | 0.4 | 0.4 | 0.4 | — |
| | $Na_2O$ | 0.18 | 0.18 | 0.12 | 0.26 | 0.23 | 0.12 | 0.12 |
| | $K_2O$ | 0.26 | 0.21 | 0.28 | 0.40 | 0.18 | 0.29 | 0.29 |
| | $Li_2O$ | 0.51 | 0.51 | 0.54 | 0.30 | 0.54 | 0.54 | 0.54 |
| | $Fe_2O_3$ | 0.44 | 0.44 | 0.44 | 0.44 | 0.44 | 0.44 | 0.44 |
| | $TiO_2$ | 0.41 | 0.95 | 0.62 | 0.60 | 0.51 | 0.41 | 0.75 |
| | SrO | 1.1 | — | 0.5 | — | — | — | 1.4 |
| | $F_2$ | — | — | — | — | — | 0.2 | — |
| Ratio | C1 | 3.79 | 4.0 | 4.47 | 4.58 | 4.32 | 4.32 | 2.53 |
| | C2 | 2.06 | 2.06 | 2.40 | 2.08 | 2.17 | 2.17 | 2.18 |
| Parameter | Forming temperature/° C. | 1297 | 1296 | 1305 | 1298 | 1303 | 1300 | 1301 |
| | Liquidus temperature/° C. | 1201 | 1199 | 1220 | 1199 | 1204 | 1197 | 1205 |
| | ΔT/° C. | 96 | 97 | 85 | 99 | 99 | 103 | 96 |
| | Peak crystallization temperature/° C. | 1032 | 1033 | 1022 | 1034 | 1030 | 1034 | 1028 |
| | Elastic modulus/GPa | 94.3 | 94.7 | 99.2 | 98.5 | 97.4 | 97.1 | 94.8 |
| | Powder weight loss/% | 0.95 | 0.85 | 0.8 | 0.9 | 0.9 | 0.95 | 0.9 |

TABLE 1C

|  |  | A15 | A16 | A17 | A18 | S glass | Traditional R glass | Improved R glass |
|---|---|---|---|---|---|---|---|---|
| Component | $SiO_2$ | 58.2 | 58.2 | 58.0 | 56.9 | 65 | 60 | 60.75 |
|  | $Al_2O_3$ | 19.2 | 19.2 | 19.1 | 21.0 | 25 | 25 | 15.80 |
|  | CaO | 8.1 | 7.8 | 6.4 | 5.3 | — | 9 | 13.90 |
|  | MgO | 9.4 | 9.7 | 9.1 | 10.4 | 10 | 6 | 7.90 |
|  | $Y_2O_3$ | — | 2.0 | 4.5 | 3.5 | — | — | — |
|  | $La_2O_3$ | 2.0 | — | — | 0.5 | — | — | — |
|  | $Na_2O$ | 0.14 | 0.11 | 0.14 | 0.11 | trace amount | trace amount | 0.73 |
|  | $K_2O$ | 0.31 | 0.30 | 0.30 | 0.24 | trace amount | trace amount | |
|  | $Li_2O$ | 0.40 | 0.50 | 0.50 | 0.61 | — | — | 0.48 |
|  | $Fe_2O_3$ | 0.44 | 0.44 | 0.44 | 0.44 | trace amount | trace amount | 0.18 |
|  | $TiO_2$ | 0.75 | 0.49 | 0.46 | 0.74 | trace amount | trace amount | 0.12 |
|  | SrO | 0.7 | 0.7 | 0.7 | — | — | — | — |
|  | $CeO_2$ | — | 0.2 | — | — | — | — | — |
| Ratio | C1 | 2.35 | 2.20 | 4.79 | 4.17 | 0 | 0 | 0 |
|  | C2 | 2.04 | 1.98 | 2.10 | 2.02 | 2.5 | 4.17 | 2 |
| Parameter | Forming temperature/°C. | 1302 | 1298 | 1297 | 1306 | 1571 | 1430 | 1278 |
|  | Liquidus temperature/°C. | 1204 | 1200 | 1198 | 1216 | 1470 | 1350 | 1210 |
|  | ΔT/°C. | 97 | 98 | 99 | 90 | 101 | 80 | 68 |
|  | Peak crystallization temperature/°C. | 1027 | 1031 | 1033 | 1023 | — | 1010 | 1016 |
|  | Elastic modulus/GPa | 92.2 | 93.4 | 98.6 | 97.6 | 89 | 88 | 87 |
|  | Powder weight loss/% | 0.85 | 0.9 | 0.9 | 0.95 | — | 1.25 | 1.5 |

It can be seen from the values in the above tables that, compared with the S glass and traditional R glass, the glass fibre composition of the present invention has the following advantages: (1) much higher elastic modulus; (2) much lower liquidus temperature, which helps to reduce crystallization risk and increase the fibre drawing efficiency; relatively high peak crystallization temperature, which indicates that more energy is needed for crystal nucleuses to form and grow during the crystallization process, i.e. the crystallization risk of the glass of the present invention is smaller under the same conditions;

Meanwhile, compared with the improved R glass, the glass fibre composition of the present invention has the following advantages: (1) much higher elastic modulus; (2) relatively high peak crystallization temperature, which indicates that more energy is needed for crystal nucleuses to form and grow during the crystallization process, i.e. the crystallization risk of the glass of the present invention is smaller under the same conditions; (3) Much lowered weight loss showing that the chemical stability of the glass is significantly improved.

Both S glass and traditional R glass cannot enable the achievement of production with refractory-lined furnaces and, with respect to improved R glass, part of the glass properties is compromised to reduce the liquidus and forming temperatures, so that the production difficulty is decreased and the production with refractory-lined furnaces could be achieved. By contrast, the glass fibre composition of the present invention not only has a sufficiently low liquidus temperature and lower crystallization rate which permit the production with refractory-lined furnaces, but also significantly increases the glass modulus and chemical stability, thereby resolving the technical bottleneck that the performance of S and R glass fibres cannot be improved with the growth of production scale.

The glass fibre composition according to the present invention can be used for making glass fibres having the aforementioned excellent properties.

The glass fibre composition according to the present invention in combination with one or more organic and/or inorganic materials can be used for preparing composite materials having excellent performances, such as glass fibre reinforced base materials.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by such phrase as "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fibre composition of the present invention not only has a sufficiently low liquidus temperature and crystallization rate which enable the production with refractory-lined furnaces, but also significantly increases the glass modulus and chemical stability, thereby resolving the technical bottleneck that the performance of S glass fibre and R glass fibre cannot be improved with the enhanced production scale. Compared with the current main-stream high-performance glasses, the glass fibre composition of the present invention has made a breakthrough in terms of elastic modulus, crystallization performance and chemical stability of the glass, with significantly improved modulus, remarkably reduced crystallization risk and noticeably improved chemical stability. Thus, the overall technical solution of the present invention is particularly suitable for the production of high-performance glass fibre with excellent chemical stability in refractory-lined furnaces.

The invention claimed is:

1. A high-performance glass fiber composition, comprising the following components expressed as percentage by weight:

| | |
|---|---|
| $SiO_2$ | 53-64% |
| $Al_2O_3$ | >19% and <25% |
| $RE_2O_3 = Y_2O_3 + La_2O_3 + Gd_2O_3$ | 0.05-7% |
| $R_2O = Li_2O + Na_2O + K_2O$ | 0.05-1% |
| $CaO + MgO + SrO$ | 10-24% |
| $CaO$ | 1.5-12% |
| $TiO_2$ | <2% |
| $Fe_2O_3$ | <1.5% | wherein, the range of the weight percentage ratio $C1=RE_2O_3/R_2O$ is greater than 0.5.

2. The high-performance fiber glass composition according to claim 1, wherein the content range of MgO by weight percentage is 8.1-12%.

3. The high-performance glass fiber composition according to claim 1, wherein the content range of CaO by weight percentage is 5-10%.

4. The high-performance glass fiber composition according to claim 1, wherein the content range of SrO by weight percentage is 0.1-2%.

5. The high-performance glass fiber composition according to claim 1, comprising $CeO_2$ with the weight percentage of 0-1%.

6. The high-performance glass fiber composition according to claim 1, wherein the content range of $R_2O=Li_2O+Na_2O+K_2O$ by weight percentage is greater than or equal to 0.05% and lower than 0.97%.

7. The high-performance glass fiber composition according to claim 1, wherein the content range of $SiO_2+Al_2O_3$ by weight percentage is lower than 80.4%.

8. The high-performance glass fiber composition according to claim 1, wherein the range of the weight percentage ratio $C2=Al_2O_3/MgO$ is greater than 1.8.

9. The high-performance glass fiber composition according to claim 1, comprising the following components expressed as percentage by weight:

| | |
|---|---|
| $SiO_2$ | ≥53% and <63% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.05-7% |
| $R_2O = Li_2O + Na_2O + K_2O$ | 0.05-1% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% | wherein, the range of the weight percentage ratio $C1=RE_2O_3/R_2O$ is greater than 0.5.

10. The high-performance glass fiber composition according to claim 1, comprising the following components expressed as percentage by weight:

| | |
|---|---|
| $SiO_2$ | ≥53% and <63% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.5-6% |
| $R_2O = Li_2O + Na_2O + K_2O$ | 0.05-1% |
| $Li_2O$ | ≥0.05% and <0.55% |
| $CaO + MgO + SrO$ | 10-24% |
| $CaO$ | 1.5-12% |
| $TiO_2$ | <2% |
| $Fe_2O_3$ | <1.5% | wherein, the range of the weight percentage ratio $C1=RE_2O_3/R_2O$ is greater than 0.5, and the range of the weight percentage ratio $C2=Al_2O_3/MgO$ is greater than 1.8.

11. The high-performance glass fiber composition according to claim 1, comprising the following components expressed as percentage by weight:

| | |
|---|---|
| $SiO_2$ | ≥53% and <63% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.5-6% |
| $R_2O = Li_2O + Na_2O + K_2O$ | ≥0.05% and <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% | wherein, the range of the weight percentage ratio $C1=RE_2O_3/R_2O$ is greater than 0.5, and the range of the weight percentage ratio $C2=Al_2O_3/MgO$ is greater than 1.95.

12. The high-performance glass fiber composition according to claim 1, comprising the following components expressed as percentage by weight:

| | |
|---|---|
| $SiO_2$ | ≥53% and <63% |
| $Al_2O_3$ | >19% and <25% |
| $SiO_2 + Al_2O_3$ | <82% |
| $RE_2O_3 = Y_2O_3 + La_2O_3 + Gd_2O_3$ | 0.5-7% |
| $Y_2O_3$ | 0.5-5% |
| $R_2O = Li_2O + Na_2O + K_2O$ | ≥0.05% and <0.97% |
| $Li_2O$ | 0.05-0.85% |
| $CaO + MgO + SrO$ | 10-24% |
| $CaO$ | 1.5-12% |
| $TiO_2$ | <2% |
| $Fe_2O_3$ | <1.5% | wherein, the range of the weight percentage ratio $C1=RE_2O_3/R_2O$ is greater than 0.5, and the range of the weight percentage ratio $C2=Al_2O_3/MgO$ is greater than 1.8.

13. The high-performance glass fiber composition according to claim 1, comprising the following components expressed as percentage by weight:

| | |
|---|---|
| $SiO_2$ | ≥53% and <61.4% |
| $Al_2O_3$ | >19% and <25% |
| $SiO_2 + Al_2O_3$ | <80.4% |
| $RE_2O_3 = Y_2O_3 + La_2O_3 + Gd_2O_3$ | 0.05-7% |
| $R_2O = Li_2O + Na_2O + K_2O$ | ≥0.05% and <0.97% |
| $Li_2O$ | 0.05-0.85% |

-continued

| | |
|---|---|
| CaO + MgO + SrO | 10-24% |
| CaO | 1.5-12% |
| $TiO_2$ | <2% |
| $Fe_2O_3$ | <1.5% | wherein, the range of the weight percentage ratio $C1=RE_2O_3/R_2O$ is greater than 0.5.

14. The high-performance glass fiber composition according to claim 1, comprising the following components expressed as percentage by weight:

| | |
|---|---|
| $SiO_2$ | ≥53% and <61.4% |
| $Al_2O_3$ | >19% and ≤23% |
| $SiO_2 + Al_2O_3$ | <80.4% |
| $RE_2O_3 = Y_2O_3 + La_2O_3 + Gd_2O_3$ | 0.5-6% |
| $R_2O = Li_2O + Na_2O + K_2O$ | 0.05-1% |
| $Li_2O$ | 0.05-0.85% |
| CaO + MgO + SrO | 10-24% |
| CaO | 1.5-12% |
| $TiO_2$ | <2% |
| $Fe_2O_3$ | <1.5% | wherein, the range of the weight percentage ratio $C1=RE_2O_3/R_2O$ is greater than 1, and the range of the weight percentage ratio $C2=Al_2O_3/MgO$ is greater than 1.95.

15. A glass fiber being produced from the glass fiber compositions described in claim 1.

16. A composite material incorporating the glass fiber described in claim 15.

* * * * *